United States Patent Office 3,832,306
Patented Aug. 27, 1974

3,832,306
PROCESS FOR THE PREPARATION OF ACTIVE CARBON FROM HALOHYDROCARBONS
Homer L. Hackett, Lake Charles, La., and Charles M. Starks, Ponca City, Okla., assignors to Continental Oil Company, Ponca City, Okla.
No Drawing. Filed Sept. 11, 1972, Ser. No. 287,955
Int. Cl. C01b 31/08
U.S. Cl. 252—422                                             1 Claim

ABSTRACT OF THE DISCLOSURE

A process for producing active carbon and hydrogen halide by mixing a halohydrocarbon with a Lewis acid catalyst in an inert atmosphere and gradually increasing the temperature to initiate and maintain evolution of hydrogen halide, and recovering hydrogen halide and a carbon mass containing highly crystalline carbon.

---

This invention relates to a new active carbon and a process for producing it and a process for recovering halogen from halogenation by-products.

Numerous types of carbon are known which vary in properties from crystalline graphite, through activated charcoal to amorphous carbon black. Each type of carbon has a different and characteristic structure and degree of activation. Such carbon products are used as adsorbents, as catalysts, and even as fuel. Typical carbon products and methods of preparation are described in U.S. Pats. Nos. 1,238,774; 2,017,226; 2,127,577; 2,592,603; 3,018,288; 3,066,099; and 3,446,865.

It has now been discovered that a certain active carbon can be produced by mixing a halohydrocarbon having at least one halide substituent selected from iodine, bromine, and chlorine with a Lewis acid catalyst, initiating evolution of hydrogen halide from said mixture, continuing evolution of hydrogen halide to form a substantial carbon mass and recovering the carbon from said mixture.

The active carbon of this invention exhibits unique adsorbent and activity characteristics. Furthermore, the carbon structure can be varied from granular particles to a porous mass to give the desired combination of structure and activity. These properties can be varied by one skilled in the art in view of this disclosure by varying the rate of carbonization, the starting halohydrocarbon, the degree of completion of carbonization, the particular catalyst, and other reaction parameters such as decreased concentration or viscosity with the use of solvent.

Any halohydrocarbon containing at least one halide substituent selected from iodine, bromine, and chlorine can be used to produce the active carbon by the process of this invention. Fluorine does not react satisfactorily for the carbonization reaction, but fluorine and other substituents that do not interfere with the process can be present. A preferred class of halohydrocarbons for this invention is the low molecular weight halohydrocarbons which are normally gaseous or liquid and those that are gaseous or liquid below a temperature of about 500° C. Particularly preferred are halohydrocarbons having from 1 to 22 carbon atoms per each hydrocarbon portion. Halohydrocarbon is used herein to mean a molecule having a hydrocarbon portion with at least one halide substituent. The hydrocarbon portion can be aliphatic, cycloaliphatic, aromatic, olefinic, or a combination thereof. The halide can be one halide from the group set forth herein. Preferably, there are 1–6 halide substituents per hydrocarbon portion and either all the same halide or different halides from the group. Chlorine is a preferred halide because it is readily removed from the reaction mass.

Any Lewis acid catalyst which will initiate the carbonization reaction under the conditions desired can be used for the process of this invention. Suitable Lewis acid catalysts are discussed in *Freidl-Crafts and Related Reactions*, edited by G. A. Olah, 1963, Interscience, and particularly in Chapter 3 of Vol. I. Preferred catalysts are metallic compounds, especially halides of aluminum, iron, titanium, zirconium, vanadium, silver, antimony, and combinations thereof. The halide for the catalyst is selected from the group and combinations set forth for the halohydrocarbons. Aluminum, iron, and titanium chlorides and bromines are effective under preferred reaction conditions.

In a preferred process of this invention, the halohydrocarbon is a liquid. The catalyst is mixed with the halohydrocarbon in a reaction vessel, and hydrogen halide evolution is initiated. Any convenient temperature and pressure can be used, but the pressure is preferably autogenous. The temperature can be −40 to about 500° C. preferably 200–500° C., and it is regulated to provide refluxing of the mixture and the rate of evolution of hydrogen halide to give the desired carbon physical properties, for example, slow reaction, i.e., low temperature carbonization produces highly crystalline carbon particles.

Other conventional variations can be used to modify the carbonization reaction of this invention. For example, solvent can be used to reduce concentration and viscosity. Olefinic hydrocarbons can be slowly added or bubbled through the mixture to polymerize the active carbon into an amorphous mass or particles. Gaseous halohydrocarbons can be bubbled through a solution of catalyst to produce the active carbon.

The carbonization reaction can be initiated by merely mixing the halohydrocarbon and catalyst. However, at low temperatures, the initial reaction is accelerated by adding hydrogen halide to the mixture.

The nature of the active carbon produced can also be varied by the degree of completion of the carbonization reaction. For example, the mixture can be completely carbonized into one carbon mass or the carbonization can be stopped when a substantial carbon mass forms as carbon particles. A substantial carbon mass is used herein to designate the formation of carbon particles in the reaction mixture which can be observed by a change in color of the mixture. During the carbonization reaction catalyst poisons such as water or alcohol are to be avoided. These agents can be added to the mixture to stop the reaction at the desired degree of completion. To prevent catalyst poisoning, an inert atmosphere such as nitrogen is not essential but can be used.

After the carbon is formed and the reaction complete or stopped, the carbon can be recovered and treated by several methods, including conventional methods. If the carbon is suspended in liquid or contains appreciable liquid, this can be removed by conventional means such as filtration and drying in an inert atmosphere oven at high temperature. Several alternative treating methods can also be used. For example, the carbon can be calcined with steam to convert certain catalyst, i.e., aluminum chloride, the alumina producing a carbon alumina combination. Likewise, the carbon can be washed with dilute hydrochloric acid and water to remove any hydrogen halide or catalyst leaving pure active carbon. The active carbon of this invention can be used directly as adsorbent or catalyst or it can be further activated or treated with other catalytic materials such as deposited noble metal catalysts. The process of this invention is especially adaptable to converting by-product halohydrocarbons and mixtures thereof into useful active carbon.

By the process of this invention halogen can be recovered from halogenation by-products such as mixed halogenated by-products. A typical source of such by-products is the "still bottoms" or mixed residual halogenated products from an ethylene chlorination-oxychlorination unit which produces vinyl chloride monomer. By this process the halogen is recovered as hydrogen halide which can be recycled to the halogenation process by conventional techniques. In this case, the active carbon can be considered a by-product of halogen recovery. The carbon can be used for an adsorbent, catalyst or merely as fuel as described herein.

The following examples illustrate the process and active carbon of this invention. Parts, percentage, and ratios are by weight unless indicated otherwise.

Example 1

Aluminum chloride (23.1 g, 0.173 mole) and 1,1,2-trichlorethane (113.7 g, 0.85 mole) is added to a 250-ml, three-neck flask. The flask is equipped with a stirrer, a reflux condenser, and means for sweeping with a slow current of argon. The exit gas from the reflux condenser is led to a Fisher-Mulligan gas washer for absorption of the evolved hydrogen chloride. Heat is supplied by a controlled temperature oil bath. On heating and stirring, hydrogen chloride evolution starts at about 70° C. The mixture is heated for almost 5 hours at 80° C. The mixture gradually becomes more viscous and black until it is too thick to stir. The weight of the reaction mixture is 63.02 g, which shows a weight loss of 72.78 g, with 48.4 g of hydrogen chloride in the exit gas scrubber.

The flask is then surrounded by a bath of dry salt and heated at 250° C for 5 hours. Another 12.5 g of hydrogen chloride is collected in the scrubber.

After cooling, the solid black residue is removed from the flask as black clinkers and ground in a Waring Blender with hot water containing 28 g of sodium potassium tartrate to remove most of the aluminum. The carbon is filtered and washed again with hot water in the blender. It is then filtered out and dried in a vacuum oven at 70° C. The weight of fine granular black solid is 30.64 g.

Analysis shows 52.91 percent carbon, 2.64 percent hydrogen.

Example 2

1,2-Dichloroethane (100 g.) is added slowly to a refluxing mixture of 10 g 1,1-dichloroethane and 5 g. of aluminum chloride. The rate of addition is adjusted such that the hydrogen chloride evolution is not too vigorous (about 10–200 cc./min.) (1–5 hours). After HCl evolution has stopped, the reaction mixture is cooled and blended in a high-speed mixer with 600 ml of water. A large part of the water is decanted away from the solid, 550 ml. of fresh water is added, and the blending is repeated. The black carbonaceous material is collected on the filter and washed twice with 3 percent aqueous hydrochloric acid and finally with water until the washings are approximately neutral to litmus The solid is dried in a vacuum oven at 120° C. for 24 hours and then heated for 3 hours at 500–700° C. in a furnace under a nitrogen atmosphere. The resulting carbon is highly porous and is a good adsorbent for many organic substances.

Example 3

Finely ground aluminum chloride (7.3 g.) is suspended in 100 ml. of heptane. The $AlCl_3$ is activated by passing anhydrous hydrogen chloride through the solution until it is saturated.

A mixture of vinyl chloride (9 percent) and 1,2-dichloroethane (91 percent) is then added at such a rate that evolved heat causes refluxing to occur. Hydrogen chloride produced in the reaction is absorbed in water. After 170 g of the vinyl chloride-1,2-dichloroethane mixture has been added, the reaction is stopped by adding water. The clear heptane layer is decanted to leave a tarry viscous material. A part of this material (30 g.) is blended with water and worked up as described in Example 1 to give highly activated carbon. The remaining part of the tarry material is heated (final temperature 120° C.) in a stream of nitrogen to evaporate volatile material, then in steam to hydrolyze the aluminum chloride. The resulting black product is then heated at 300–600° C in a slow stream of nitrogen to produce a highly adsorbent carbon also containing alumina.

Example 4

The procedure described in Example 3 is repeated using a tarry "still bottoms" product, produced in a commercial ethylene chlorination-oxychlorination unit. This material contains about 30 percent 1,2-dichloroethane, 30 percent 1,1,2-trichloroethane, and 40 percent of a mixture of a number of other chlorinated hydrocarbons. The product from this reaction is washed with water and dilute hydrogen chloride to remove aluminum chloride and is then heated to 500° C. to produce a porous carbon product. The porosity of this material is increased by heating at 500–700° C. in the presence of steam.

Example 5

Example 4 is repeated using ferric chloride, rather than aluminum chloride, as the catalyst.

Example 6

Example 4 is repeated using powdered metallic aluminum (3.1 g), instead of aluminum chloride, as the catalyst.

We claim:
1. A process for producing active carbon and hydrogen chloride, comprising: mixing and heating tarry still bottoms product produced in an ethylene chlorination-oxychlorination process with a metal halide Lewis acid catalyst in a sweeping inert gas atmosphere and under refluxing conditions; wherein the rate of mixing and heating is gradual and controlled to initiate and continue the evolution of hydrogen chloride and to form a substantial carbon mass containing highly crystalline carbon; recovering said evolved hydrogen chloride and said carbon from the mixture; washing said carbon to remove said Lewis acid and/or calcining said carbon to produce an active carbon product; and recovering said active carbon product.

References Cited
UNITED STATES PATENTS

| | | | |
|---|---|---|---|
| 3,342,555 | 9/1967 | McMillan | 252—444 |
| 2,490,973 | 12/1949 | Leonard et al. | 260—677 XA |
| 2,838,577 | 6/1958 | Cook | 260—677 XA |
| 3,450,780 | 6/1969 | Hartnett | 260—677 XA |
| 2,944,031 | 7/1960 | Mason | 252—421 |
| 3,258,363 | 6/1966 | Lieb | 423—449 |
| 3,516,791 | 6/1970 | Evans et al. | 252—421 |
| 2,008,145 | 7/1935 | Morrell | 252—421 |
| 3,018,288 | 1/1962 | Tokime et al. | 252—421 |

DANIEL E. WYMAN, Primary Examiner

P. E. KONOPKA, Assistant Examiner

U.S. Cl. X.R.

44—1-F; 201—2.5, 25;252—421, 445, 447; 423—445, 449, 461, 481, 488